United States Patent

Weigelt et al.

[11] Patent Number: 5,712,782
[45] Date of Patent: Jan. 27, 1998

[54] METHOD OF OPTIMIZING UTILIZATION OF A GROUP OF AGRICULTURAL MACHINE

[75] Inventors: Horst Weigelt, Guetersloh; H. H. Wippersteg, Buende; Stefan Boettinger, Bielefeld; Thilo Steckel, Harsewinkel, all of Germany

[73] Assignee: Claas KGaA, Harsewinkel, Germany

[21] Appl. No.: 631,968

[22] Filed: Apr. 15, 1996

[30] Foreign Application Priority Data

Apr. 15, 1995 [DE] Germany .................. 195 14 223.3

[51] Int. Cl.$^6$ .................................................. G05D 1/00
[52] U.S. Cl. .................. 364/424.07; 364/424.028; 364/424.029; 364/424.038
[58] Field of Search ............... 364/424.07, 424.027, 364/424.028, 424.029, 424.034, 424.037, 424.038, 424.04

[56] References Cited

U.S. PATENT DOCUMENTS

| | | | |
|---|---|---|---|
| 3,568,161 | 3/1971 | Knickel | 340/172.5 |
| 4,709,265 | 11/1987 | Silverman | 358/108 |
| 4,804,937 | 2/1989 | Barbiaux et al. | 340/52 F |
| 4,831,539 | 5/1989 | Hagenbuch | 364/449 |
| 5,046,130 | 9/1991 | Hall et al. | 455/78 |
| 5,122,959 | 6/1992 | Nathanson et al. | 364/436 |
| 5,194,860 | 3/1993 | Jones et al. | 340/370.02 |
| 5,263,396 | 11/1993 | Ladan et al. | 89/1.11 |
| 5,311,197 | 5/1994 | Sorden et al. | 342/457 |
| 5,528,499 | 6/1996 | Hagenbuch | 364/424.07 |
| 5,586,030 | 12/1996 | Kenner et al. | 364/424.027 |

FOREIGN PATENT DOCUMENTS 19514223.3  4/1995  Germany .

*Primary Examiner*—Kevin J. Teska
*Assistant Examiner*—Stephen J. Walder, Jr.
*Attorney, Agent, or Firm*—Michael J. Striker

[57] ABSTRACT

In the process for optimizing operation of a group of agricultural machines a controlling processor, which exchanges data telemetrically with on-board processors of agricultural machines and devices, optimizes the internally optimized control cycles of the individual on-board processors and transmits controlling data to the on-board processors, which it has determined from collective scanning of operating data transmitted to it from the entire group of agricultural machines. Overloading of available data transmission capacity and excessively large memory capacity requirements are avoided by a special categorizing of data and an advantageous selection of memory locations for the resulting data.

17 Claims, 2 Drawing Sheets

METHOD OF OPTIMIZING UTILIZATION OF A GROUP OF AGRICULTURAL MACHINE

BACKGROUND OF THE INVENTION

The present invention relates to a method of using agricultural machines, and, more particularly, to a method of optimizing the operation and use of a number of agricultural machines.

Over the years many different apparatuses and machines have been used in agriculture to perform required seasonally changing tasks. Besides working the ground and planting seeds also applying fertilizer and cultivating as well as harvesting and transporting operations are to be performed. Moreover improvements of the land surface are performed as well as important observations made in field work and rough work tasks are performed (stone bracing, weeding, damming, etc.). In past decades the engineering concepts for these apparatuses and machines were so extensive that operational improvements can only be achieved now with exponentially increasing expense and effort with additional applications always becoming less.

Optimization using electronic devices particularly played an ever increasing role in past years in addition to the mechanical improvement of the apparatuses and machines. A good synopsis of the current state of the art is provided by the book written by Hermann Auernhammer, Electronics in Tractors and Machines, BLV Verlagsgesellschaft, München 1989 in which the applications, operations and developments of electronics are described. Thus it is known to equip agricultural machines and apparatuses with sensors, processors and controllers, which perform monitoring and control operations. The electronics is also in the position to detect operating conditions, evaluate operating conditions and to optimize machine adjustment to the measured operating conditions with the aid of a predetermined characteristic curve. Besides the automatic optimization of the individual machines the electronics can also diagnose variations of the operating state from a predetermined set operating state, to make suggestions for machine operation and to collect data, which can be used in later operating steps by other machines. Auernhammer on page 74 of the above-cited Book suggests use of machine determined data as the basis for guiding operations. Moreover they must be put in the required form for that and guidance of the operations must be performed. The measured data from the tractor—as suggested by Auernhammer—should be further processed according to the suggestions in a manner which is known in itself. Auernhammer described data transfer between the operating processor and the individual machines on pages 99 to 102 by fixed cable, a so-called RAM box or a chip card as communication agent.

Auernhammer at the beginning of Chapter 7 of the above-cited book states that the information obtained from the electronics must not be considered isolated, but must be viewed as a whole and the highest goal must be flow of information. Auernhammer requires consideration of the electronics in a complete system. Auernhammer develops a hierarchical order of electronic applications in agriculture, in which process control is at the lowest level, operational guidance at a middle level and at the highest level the combination or coordination of operations in a central processor. On page 166 of the above-cited book Auernhammer mentions 1. agriculturally suitable accessible physical connections(cable conductors) 2. uniform data formats and 3. definite data content as prerequisites for problem-free communication between the indicated levels.

German Patent Application DE 43 22 293 describes a method for electronic management of agricultural machines in which telemetry data are exchanged between the machine and a computer station. For example in this application it is explained that in planting or tilling operations based on new actual data from a stationary computer station and/or a processor of a harvesting machine this new data are transmitted from the respective computer processor to the tilling or planting machine and thus the tilling or planting process is controlled by telemetric data exchange from an exterior source.

To maintain a stated data base for control of several agricultural machines by a computer station it is necessary to collect and process as large an amount of data as possible. However since the memory and data transmission capacity are limited and/or expensive, in unstructured data collection and transmission the problem arises that insufficient memory space or transmission capacity is available and thus either capacity must be augmented at great expense or the amount of data to be transmitted must be reduced which impairs the operation of the entire system.

SUMMARY OF THE INVENTION

It is an object of the present invention to provide a process for telemetric data exchange for agricultural machines, in which the memory capacity and telemetric transmission of data are optimized so that the collection of a sufficiently effective amount of data with a minimum consumption of memory space and data transmission capacity is possible and the data exchange is used to optimize the performance of the entire group of agricultural machines and apparatuses participating in the data exchange with the controlling processor.

According to the invention, this object is attained by a special organization of data flow and a particularly advantageous localization of the stored data. The central element used for the optimization of the group of machines is the controlling processor. In this controlling processor the actual positions of the machines and devices to be optimized are stored, the actual operating conditions are stored, the consumption or required amounts of auxiliary and operating materials (e.g. fuel, seed materials applied, fertilizer applied and other chemicals applied) are transmitted and the expected time point and amount of replacement materials and required maintenance work are signalled. These data which are supplied by the machines and devices are distributed by the controlling processor in such a way that a continuous processing of this data is permitted. These data input from the machines are compared with the application device data and logistic application possibilities, so that the required adjustments of the operating parameters of the individual machines and devices are determined and appropriate adjusting commands are conducted to the concerned machines and devices.

Also external data available for the controlling processor can be included in the determination of the optimum operating parameters. For example, regional weather forecasts, replacement part and maintenance information for the agricultural machines, chemical soil or ground water analysis or fertilizer plans and/or prepared application amounts for liquid manure, sewage materials, compost and other materials can be included in the external data. The external data can be input to the controlling processor on demand of the controlling processor and are integrated in the processing performed by the controlling processor for optimization of the operating parameters of the entire machine system.

Furthermore the data available in the controlling processor can be requested by an external host computer or data bank and processed by the information systems available there, which again are useable by the controlling processor for optimization of the harvesting machine systems controlled by it.

The data produced in the on-board or controlling processor must first be categorized. The first category criterion suggested is whether or not the data in question must or must not be transmitted to another processor. The data which must not be transmitted, are processed in the processor in which they are produced. The data, which however must be transmitted to another processor, must be sorted additionally according to the urgency of transmission and that data which is most urgently needed by the other processor must be transmitted before less urgently required data. Because of that, it is guaranteed that the transmission capacities are weighted preferentially for the more important data.

Also the data must be categorized according to the storage location for categorization of the need for transmission. Besides that data which, because of its significance and value, must be immediately transmitted to the controlling processor and stored there, other data quantities still reside in the respective individual machines, which are required only for optimization of the individual machines or can be temporarily stored by storage media such as diskette and then at a later time transmitted to the controlling processor telemetrically or by plug connection devices.

An optimum availability of the respective data is to be strived for in the categorization of the storage locations with the least possible loading of the transmission and memory capacity. Thus it is meaningful to provide data to the machines and devices, to the controlling processor or to the external data banks according to the type of data. Basically the following control is provided for data localization: in so far as some data are required only for internal regulation of an individual machine or an individual apparatus, and not for optimization of the entire system, that data should be kept in the individual machines or devices. However as soon as this data can influence the optimization of the entire group of machines, this data should be transmitted to the controlling procesor. As soon as other data present in the controlling processor are used or needed externally, the data for the external computer should be made available. A flexibility in the data localization varying from this basis is suggested in that at a higher data request rate by another computer than that in which the more frequently requested data are stored the data statement is now transmitted to the more frequently requesting computer varying from the basic rule so that the transmission bands will not be overloaded. This shift of data localization can be performed automatically by the software or under the command and control of an operator.

In a preferred embodiment of the invention the on-board processor of an agricultural machine arranged in the complete group of machines is connected with and works with a CAN-bus system. The bus system allows a cost effective integration of the on-board processor in the machine electronics as well as a standardized and reliable communication with all components, sensors and actuating devices connected to the CAN-bus system. One such CAN-bus system integrated in the agricultural machine is, for example, described in German Patent Application P 44 31 824.3. To provide the telemetric data transmission the operating module should not be directly connected to the on-board processor, but instead arranged as an individual module with separate access to the CAN-bus system. This type of arrangement allows a bidirectional communication of the CAN-bus system with the controlling processor independently of the on-board processor and external access to the CAN-bus system. Furthermore the operating module may be easily subsequently provided without redesign of the on-board processor in this arrangement.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

The agricultural machines 2 to 7 are continuously exchanging data with a controlling processor 1 by a telemetric data connection. The agricultural machines 2 to 7 can be any of a variety of different agricultural machines. For example, they can be the above-mentioned tractor with built-in working devices such as plows, saw devices, spraying devices, tanks for application of liquid manure, sewage plant materials, etc., composite applying devices, mowing devices, rotary devices, vaporizing devices, presses, loading carts, auxiliary conveying devices, or self-powered machines such as harvester threshers, field chopping machines and beet digging machines or hauling equipment of every type. These machines could exchange data in arbitrary numbers and combinations with the controlling processor 1.

Figure 1:
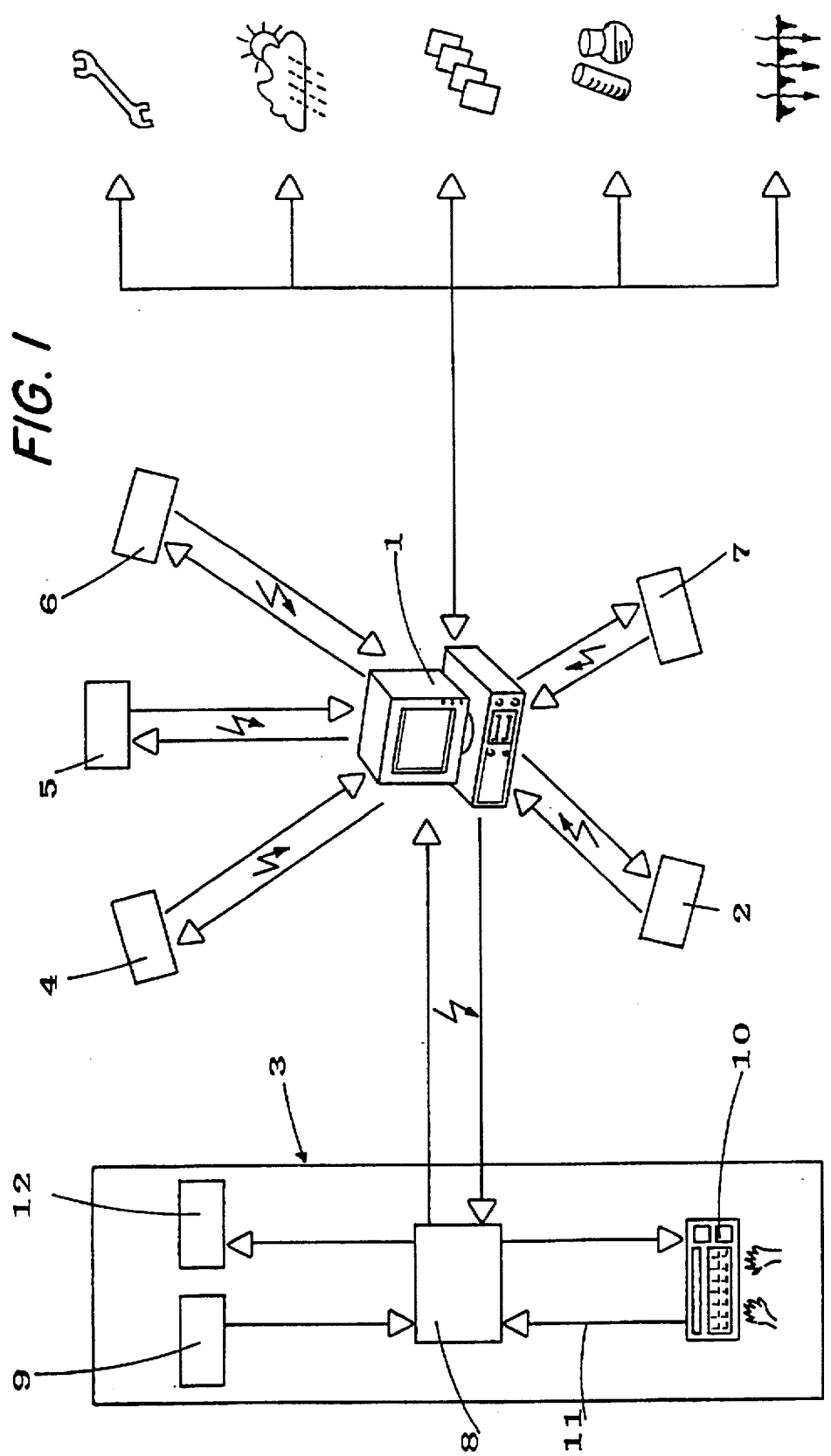
FIG. 1 is a diagrammatic representation of a system for optimizing use of agricultural machines according to the invention.

Each individual agricultural machine is equipped with an on-board processor 8 which controls the optimization process in the individual machine. The internal optimization process is shown in FIG. 1, for example, in machine 3. The on-board computer 8 receives data from a number of sensors 9, which it evaluates. Additionally to the sensor data the on-board computer 8 processes the position data, which for example a GPS-receiver produces. The operating state resulting from the measured data for the individual components of the machine 3 is indicated on the operator's console 10 to the machine operator. Both data streams are compared with a predetermined characteristic curve or criterion from the on-board processor 8, which describes the operational optimum for the individual machine according to certain input data. If deviations of the transmitted data from the given characteristic curve or criterion occur, the on-board processor 8 emits an adjusting signal to one or more actuating devices 12.

Because of these features, it is guaranteed that each individual machine is itself in an operational optimum on the basis of internal data available to it. The position data obtained from the GPS-receiver can be incorporated in the optimized control, since the determined position data are compared with other position-related data present in the on-board processor 8 and are evaluated.

Additionally to the above-described internal regulation the on-board processor 8 of a machine exchanges data with the controlling processor 1 via a telemetric data exchange. The controlling processor 1 receives data 13 from the machines 2 to 7 transmitted telemetrically. The controlling processor 1 produces a duty description of the machines 2 to 7 from the transmitted data and additional data available in the controlling processor 1. The controlling processor 1 can determine from the duty description with the aid of a predetermined characteristic curve in what way the operation of the individual machines 2 to 7 can be optimized.

For example the controlling processor 1 could calculate a position dependent fertilizer application profile from the available data, which provides an economically and ecologically required optimum depending on for example the ground condition, drying tendencies, moisture and cultivation. The controlling processor 1 can transmit this profile telemetrically to the fertilizer machine, and the on-board processor 8 of the machine can determine with the aid of this predetermined fertilizer application profile, whether the actually applied amount of the fertilizer is too high or too low and, if necessary, input this result into the internal machine control cycle. With the aid of the amount of applied fertilizer carried in an applying device and continuously determined by the on-board processor 8, the controlling processor 1 can process using a set or desired fertilizer amount to determine with a safety margin when a hauler must resupply the fertilizer machine with fertilizer to guarantee continuous operation of the fertilizer machine. Should the controlling processor 1 establish that the fertilizer supply of the applying vehicle is being exhausted at constant working speed faster than the available fertilizer can be resupplied thus the controlling processor 1 can inform the applying vehicle for reduction of the fuel consumption, to reduce the vehicle and applying speed, to halt the application and to start another application or to reduce the amount applied according to a new application profile with only small error so that no resupply of fertilizer is required. The controlling processor can transmit the instruction, of what is to be done, according to choice either to the machine operator of the fertilizer spreader or to the operator of the controlling processor as a suggestion for operation or the controlling processor can decide for itself how it is to be processed.

During operation of a harvesting machine the controlling processor 1 can determine what conveying capacity must be prepared for taking on the harvested quantity of grain. With the aid of operating data from the hauler the controlling processor 1 can determine when the required transport capacity is available at the earliest. The controlling processor 1 can transmit transport orders according to choice automatically or at the command of the controlling processor 1 to the driver of the transport unit. According to the availability of the transport capacity the controlling processor can inform the on-board processor 8 of the harvesting machine or the operator of the harvester to reduce the grain loss and the fuel consumption by reducing the travel speed. With the aid of the moisture detected by the sensor 9 of the harvesting machine the controlling processor 1 can estimate the probable drying needs of the grain and compare them with the drying capacity. If the drying capacity is exhausted, the controlling processor 1 can command the harvesting machine to cease operation on the wet grain field and conduct further processing in the dry areas.

The continuous data transmission from the agricultural machines 2 to 7 to the controlling processor 1 allows the work to be performed and the yield positioned in an applying device to be accurately monitored. Geographic and soil structure data of the respective fields are stored in a coordinate array the applying device or cart. With the aid of sensors in the harvesting machine yield amounts, soil and grain moisture, weeding, stone stemming or other work, etc can be detected and input with the existing data in the controlling processor 1. By comparison of the actually determined data with the existing data it is possible to produce immediate relationships, e.g., between ground working, fertilizer applications, plant protecting work, watering and harvest yield, to test the sensors with improbable new data and as needed to identify the new data as false. With the aid of transmission of position data it is possible to preselect the travel track by the controlling processor so that multiple passes over the same ground surfaces are prevented during a growing season or period in order to avoid to high a soil compaction.

Furthermore it is conceivable that anomalies during operation of an agricultural machine are reported to the controlling processor 1 by the machine. These "anomalies" include interruptions in the drive (excessive operating temperature of oil and cooling water), operating material losses as a result of leakage, implausible signals from sensors or malfunctions of actuating devices. The controlling processor can analyze these anomalies and the operation or use of the machines 2 to 7 can be changed according to these results. At the same time the controlling processor 1 can influence the capacity planning of the work place and inform the machines 2 to 7 of required maintenance and repairs.

For all other agricultural machines, which are connected to the controlling processor 1, equal or similar improvements in operation of the machines can be provided by a data exchange with the controlling processor 1. In order that the amount of data exchanged does not become excessively large, a system must be found, with the aid of which the data to be exchanged is classified and according to the classification stored in different places and/or further processed and reworked.

According to the invention the data obtained by the on-board processor 8 is first analyzed in the on-board processor 8. Next the collected data are evaluated to determine whether they must be transmitted to another processor or not. As long as the obtained evaluated data are usable only for internal machine optimization and are processed to obtain a command fed to an actuating device 12, no further transmission of this data occurs to the controlling processor 1. When the controlling processor 1 however needs the data present in the on-board processor 8 to be able to prepare a duty plan, the on-board processor 8 conducts this data further to the controlling processor 1. For example this latter type of data includes data for the worked areas, the actual position, harvested goods amounts, sensor data regarding the state of the harvested goods, consumed or still present consumable material and operating material. These data are however not transmitted in sequence of occurrence or other sequence but are transmitted arranged according to urgency or priority. Because of that, the clogging of transmission frequencies with less important data can be avoided. To reduce the data stream it is suggested that only a short reference to certain data categories at present be transmitted instead of a longer data statement so that the controlling processor 1 can automatically selected which data statement it requires. Thus for example troublesome interference can be reported by a general warning signal, after which the controlling processor 1 can seek further data. When the data reported to the controlling processor 1 no longer needs to be maintained in the machines 2 to 7, the on-board processor 8 can erase this data from the working memory.

The controlling processor 1 processes the transmitted data into a duty plan. The duty plan shows the actual work required of the respective machine, the duty steps and the subsequent application plan. The duty plan is actualized by the data from the machines 2 to 7. Besides the duty plan preparation the controlling processor 1 also stores transmitted data in application devices, which allow an actual position signal for the processing to be performed including associated operating data(e.g. application, harvest amount, other sensor data), as well as the further processing of the input data for analysis, calculation, plausibility check, etc. In so far as the data required for the duty plan preparation are incorporated in the duty plan, they can be erased from the controlling processor 1. The remaining input data are stored in the memory device available in so far as they are needed for further processing. It is possible to obtain data stored centrally on-line without additional loading of the radio bands with additional amounts of data for data comparison in the machine circuits controlled by the controlling processor 1 because of this central data storage in the controlling processor 1.

The controlling processor 1 is also connected by known telecommunication devices with an external data bank, with host computers and central data banks as well as with the telemetric connection with the machines 2 to 7. The controlling processor 1 can receive data in compressed form from an external communication partner for transmission of the compressed data. Thus it is conceivable for example to send data received by optical sensors regarding weed conditions by means of the controlling processor 1 to an expert system which evaluates the weed condition and transmits a command derived from the evaluation back to the controlling processor 1 for making and applying amounts of a plant protecting chemical composition. Also the controlling processor 1 conveys on-line questions of the expert systems to the agricultural machines and thus provides a rapid current evaluation of the plant protecting measures being performed from the expert system to the agricultural machine. By an intervening comparison with the data state present in the controlling processor 1 it is also possible to convey the weeding evaluation externally for certain areas known to be thickly weeded so that special solutions for these problem areas can be suggested.

Further it is conceivable that the controlling processor exchange data with a host computer, which sets up a weather and agricultural moisture forecast. Thus the controlling processor 1 can supply the weather and moisture data, e.g. ground and grain moisture, as forecast data to the host computer as one of many processor sources. The controlling processor 1 can however receive an indication of weather changes and moisture condition changes from the host computer. The controlling processor 1 can change forecast information into command information for the machine application planning and adjustment of the individual operating parameters. Thus the wind conditions can influence the planning of spraying or fertilizer applications and the ground and grain moisture influence the threshability, the ability to travel over the field or the action of the plant protecting agents.

As an additional application of the system according to the invention it is conceivable to retrieve actual measured values of soil load levels and of fresh supplied ground water as well as ground water flow models from an expert system to avoid exceeding certain ground water-limiting values and to permit production of suggestions for fertilizing and plant protection from the expert system, which prevent an increase of the ground water-load values above the established limiting values. Furthermore records can be prepared regarding the actual amounts applied by the controlling processor 1 which can be used as application information or other information for well organized farming against the governmental agencies and water works. The data prepared in the desired form can similarly be transmitted to the receiving entity from the controlling processor 1.

In an additional embodiment of the invention when a signal of operating disturbances or troubles is generated in an on-board processor 8 of one of the machines 2 to 7 the controlling processor 1 can transmit the signal to the manufacturer of the concerned machine for analysis by an expert system. By using the controlling processor 1 a remote diagnosis with simultaneous repair and replacement part preparation (including ET-availability check) is possible. Repair or necessary maintenance suggestions can be made directly to the machine operator by the expert system via the controlling processor 1.

It is not meaningful to equip the controlling processor with the required software, weather prediction model and data used by the expert system. It is sufficient to accomplish these tasks for the controlling processor 1 to use telecommunication means for a connection to the expert system.

Figure 2:
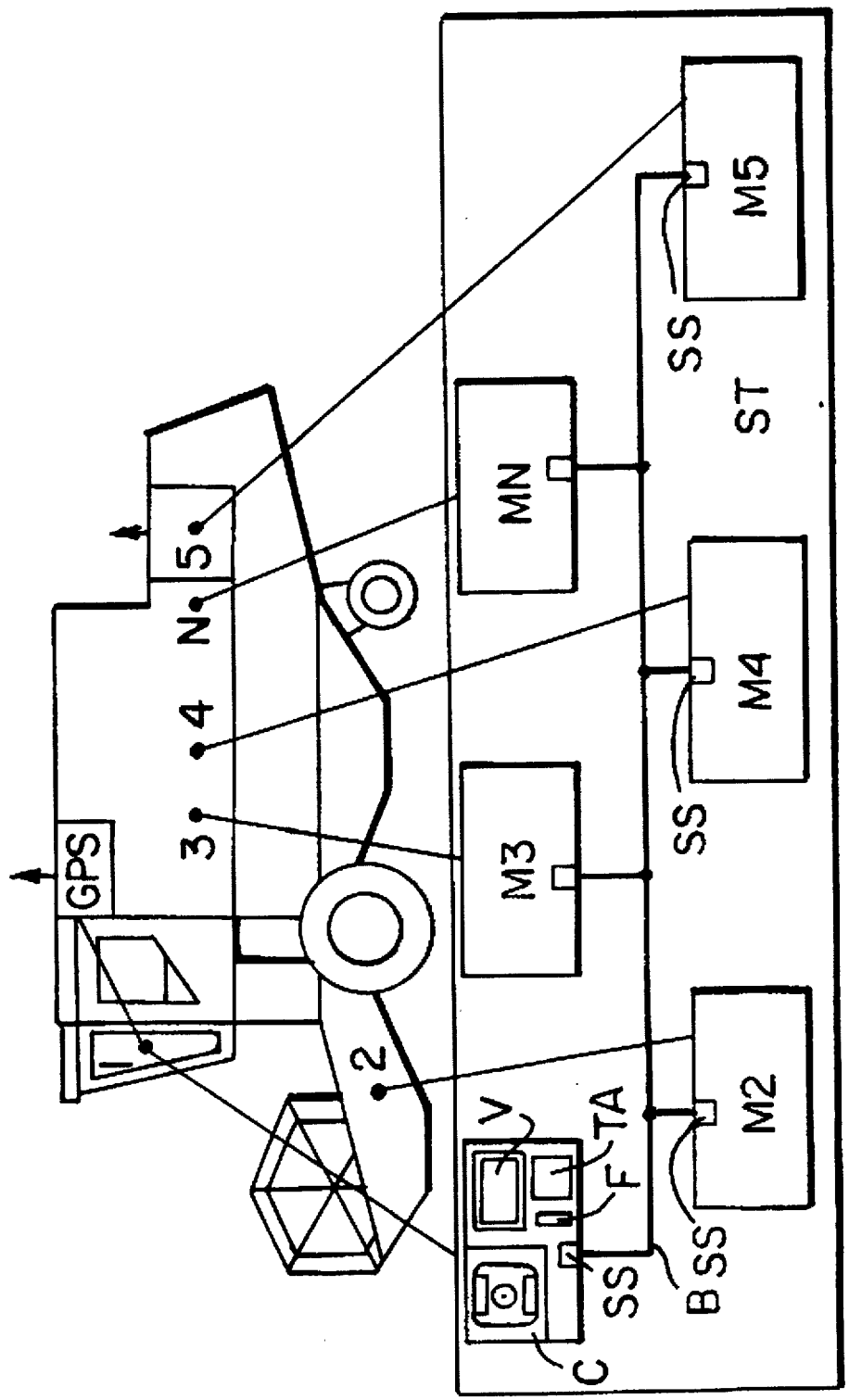
FIG. 2 is a diagrammatic view of an agricultural machine with a CAN-bus system in which an operating module has been installed with separate access to the CAN-bus system.

FIG. 2 is a diagrammatic view of an agricultural machine equipped with a CAN-bus system. The controller ST has a microprocessor network available with the bus B. The on-board processor 8, which comprises the display unit V, the controlling keyboard TA, the calculator panel F and the memory and output device C and to which a position finding unit (GPS) is connected, is installed in the driver's cockpit. Several different microprocessors 8, M2, M3, M4 and MN are connected via the interfaces SS to the CAN-bus system B. The microprocessor M5 is the operating module and is connected by a separate access means to the CAN-bus system B via the interface SS. The operating module M5 receives signals from the remaining microprocessors connected to the CAN-bus system, selects the data which are to be transmitted to the controlling processor 1, compresses this data into a format adjusted to the capacity of the general or internally available radio transmission bands and sends it to the controlling processor 1. If the operating module M5 receives data transmitted from the controlling processor 1, it decompresses it, addresses it and sends it by the CAN-bus system B to the connected microprocessors. The subsequent equipping of an existing CAN-bus system B with an operating module M5 is easily possible without additional adjustments of the remaining bus components because of the simple connection to be made of the operating module M5 to the CAN-bus system B. Machines for which an operating module has not previously been available can be integrated in the entire machine system controlled by the controlling processor 1 without additional great effort in this way. The bidirectional communication of the operating module M5 does not only allow data to be transferred from an agricultural machine 2 to 7 to the controlling processor 1 but it is also possible to transmit from the controlling processor 1 directly to the CAN-bus system B. Thus it is also conceivable that critical limited time applications and operations be controlled directly by the controlling processor via the operating module M5. Thus the controlling processor 1 can address, e.g. certain desired commands or suggestions, directly to individual microprocessors connected to the CAN-bus system B.

Also it is possible to directly perform a diagnosis of machine components controlled by the microprocesors connected to the CAN-bus system by the controlling processor 1, if necessary under the direction of an external host computer or expert system. The controlling processor 1 can suggest to the machine operator the performance of maintenance or repair work via the operating module M5, the CAN-bus system B and the on-board computer 8 and support the resulting work by transmission of video images, sketches and work information. Such supporting image and text information could however be required by the machine operator by means of the on-board processor 8 from the controlling processor 1 which transmits that information by a storage device (CD-ROM, Diskette) or reads or retrieves it from an external host computer or expert system.

To transmit information, which the controlling processor demands or needs, the operating module M5 can either retrieve a data statement which the on-board computer 8 has prepared, or it can collect and itself prepare the required data via the CAN-bus system B. In this way the operating module M5 can convert a certain basis set reportable from the controlling processor 1 to information such as the actual position, filling degree of the storage or transport devices and diverse machine operating parameters and then actualize operation.

While the invention has been illustrated and described as embodied in a method of optimizing utilization of a group of agricultural machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of optimizing operation of a plurality of agricultural machines and devices, the method comprising the steps of:
   a) providing a controlling processor (1) for controlling operation of the agricultural machines and devices (2 to 7), each of the agricultural machines and devices (2 to 7) having at least one on-board processor (8) and telemetric means for transmitting and receiving data available in the at least one on-board processor (8) to and from the controlling processor (1) for exchanging data telemetrically between the at least one on-board processor (8) and the controlling processor (1);
   b) categorizing said data exchangeable between the controlling processor (1) and the at least one on-board processor (8) of each of the agricultural machines and devices (2 to 7) into processing categories according to data processing and memory locations;
   c) processing one portion of said data on a level of the agricultural machines and devices (2 to 7) according to said processing categories to at least partially optimize operation of said agricultural machines and devices without transmitting said one portion of said data to and processing said one portion of said data in said controlling processor, said processing including storing at least a part of said one portion of said data on said level of the agricultural machines and devices; and
   d) transmitting another portion of the data on said level of the agricultural machines and devices telemetrically to a level of the controlling processor (1) for processing together with additional data not available in the agricultural machines and devices (2 to 7); and
   e) optimizing control of said agricultural machines based on controlling information available in individual ones of said agricultural machines and completing said optimizing according to said additional data not available in the agricultural machines and devices (2 to 7).

2. The method as defined in claim 1, further comprising providing software in the controlling processor (1) for processing said another portion of said data transmitted from said level of the agricultural machines and devices (2 to 7) together with said additional data and retrieving said additional data from a data base stored in the controlling processor (1) to prepare controlling data in the controlling processor (1) for transmission back to the agricultural machines and devices.

3. The method as defined in claim 1, further comprising processing said another portion of said data transmitted from said level of the agricultural machines and devices (2 to 7) together with said additional data in a remote processor and retrieving said additional data from a data bank in the remote processor by telemetric communication means via the controlling processor (1) to prepare controlling data in the controlling processor (1) for transmission back to the agricultural machines and devices (2 to 7).

4. The method as defined in claim 1, further comprising sorting data statements to be transmitted in the at least one on-board computer (8) of the agricultural machines and devices (2 to 7) and the controlling processor (1) according to urgency criteria and transmitting the data statements according to the urgency criteria so that most urgently needed data is always transmitted prior to transmission of less urgently needed data.

5. The method as defined in claim 1, further comprising transmitting characteristic code instead of complete data statements from the at least one on-board processor (8) and the controlling processor (1) to a receiving device and prioritizing data requests of the receiving processor according to the characteristic code.

6. The method as defined in claim 1, further comprising selecting only a part of said data available in the at least one on-board processor (8) of each of the agricultural machines and devices for transmission to the controlling processor (1) and transmitting only the selected part to the controlling processor (1).

7. The method as defined in claim 1, further comprising transmitting telemetrically only necessary information required for on-line optimization of control of all of the agricultural machines and devices (2 to 7) from the at least one on-board processor (8) of each of the agricultural machines and devices to the controlling processor (1).

8. The method as defined in claim 1, further comprising storing informational data in each of said processors most frequently needed in further processing in said processors.

9. The method as defined in claim 1, further comprising generating sensor data in at least one of the agricultural machines and devices (2 to 7) and reporting at least one of said sensor data and analysis results based on said sensor data to the least one on-board processor (8) of the at least one agricutural machine and device generating the sensor data.

10. The method as defined in claim 1, further comprising generating sensor data in at least one of the agricultural machines and devices (2 to 7) and reporting at least one of said sensor data and analysis results based on said sensor data to the controlling processor (1).

11. The method as defined in claim 1, further comprising exchanging data between the at least one on-board processor (8) and an external computer in an on-line operation at least partially controlled by the controlling processor (1).

12. A method of optimizing operation of a plurality of agricultural machines and devices, the method comprising the steps of:
   a) providing a controlling processor (1) for controlling operation of the agricultural machines and devices (2 to 7), each of the agricultural machines and devices (2 to 7) having at least one on-board processor (8) and telemetric means for transmitting and receiving data available in the at least one on-board processor (8) to and from the controlling processor (1) for exchanging data telemetrically between the at least one on-board processor (8) and the controlling processor (1);

b) categorizing said data exchangeable between the controlling processor (1) and the at least one on-board processor (8) of each of the agricultural machines and devices (2 to 7) into processing categories according to data processing and memory locations;

c) processing one portion of said data on a level of the agricultural machines and devices (2 to 7) according to said processing categories without transmitting said one portion of said data to and processing said one portion of said data in said controlling processor, said processing including storing at least a part of said one portion of said data on said level of the agricultural machines and devices; and d) transmitting another portion of the data on said level of the agricultural machines and devices telemetrically to a level of the controlling processor (1) for processing together with additional data not available in the agricultural machines and devices (2 to 7);

e) optimizing control of said agricultural machines based on controlling information available in individual ones of said agricultural machines and completing said optimizing according to said additional data not available in the agricultural machines and devices (2 to 7); and f) determining a ground water burden in the controlling processor (1) from operating data obtained from the at least one on-board processor (8) of one of the agricultural machines and devices.

13. A method of optimizing operation of a plurality of agricultural machines and devices, the method comprising the steps of:

a) providing a controlling processor (1) for controlling operation of the agricultural machines and devices (2 to 7), each of the agricultural machines and devices (2 to 7) having at least one on-board processor (8) and telemetric means for transmitting and receiving data available in the at least one on-board processor (8) to and from the controlling processor (1) for exchanging data telemetrically between the at least one on-board processor (8) and the controlling processor (1);

b) categorizing said data exchangeable between the controlling processor (1) and the at least one on-board processor (8) of each of the agricultural machines and devices (2 to 7) into processing categories according to data processing and memory locations;

c) processing one portion of said data on a level of the agricultural machines and devices (2 to 7) according to said processing categories without transmitting said one portion of said data to and processing said one portion of said data in said controlling processor, said processing including storing at least a part of said one portion of said data on said level of the agricultural machines and devices; and d) transmitting another portion of the data on said level of the agricultural machines and devices telemetrically to a level of the controlling processor (1) for processing together with additional data not available in the agricultural machines and devices (2 to 7);

e) optimizing control of said agricultural machines based on controlling information available in individual ones of said agricultural machines and completing said optimizing according to said additional data not available in the agricultural machines and devices (2 to 7); and f) setting up a fertilizing plan in the controlling processor (1) from operating data obtained from the at least one on-board processor (8) of one of the agricultural machines and devices.

14. A method of optimizing operation of a plurality of agricultural machines and devices, the method comprising the steps of:

a) providing a controlling processor (1) for controlling operation of the agricultural machines and devices (2 to 7), each of the agricultural machines and devices (2 to 7) having at least one on-board processor (8) and telemetric means for transmitting and receiving data available in the at least one on-board processor (8) to and from the controlling processor (1) for exchanging data telemetrically between the at least one on-board processor (8) and the controlling processor (1);

b) categorizing said data exchangeable between the controlling processor (1) and the at least one on-board processor (8) of each of the agricultural machines and devices (2 to 7) into processing categories according to data processing and memory locations;

c) processing one portion of said data on a level of the agricultural machines and devices (2 to 7) according to said processing categories without transmitting said one portion of said data to and processing said one portion of said data in said controlling processor, said processing including storing at least a part of said one portion of said data on said level of the agricultural machines and devices; and d) transmitting another portion of the data on said level of the agricultural machines and devices telemetrically to a level of the controlling processor (1) for processing together with additional data not available in the agricultural machines and devices (2 to 7);

e) optimizing control of said agricultural machines based on controlling information available in individual ones of said agricultural machines and completing said optimizing according to said additional data not available in the agricultural machines and devices (2 to 7); and f) setting up a plant protecting plan in the controlling processor (1) from operating data obtained from the at least one on-board processor (8) of one of the agricultural machines and devices.

15. An agricultural apparatus comprising an on-board processor (8) including means for internally optimizing apparatus performance, an operating module (M5) including means for a telemetric data exchange with a controlling processor (1) including means for further optimizing apparatus performance based on additional data, and a CAN-bus (B) connecting said on-board processor (8) with said operating module (M5) for data exchange therebetween, said operating module (M5) having means for direct access to the CAN-bus.

16. The agricultural apparatus as defined in claim 15, wherein the means for the telemetric data exchange provides bidirectional data exchange between the controlling processor (1) and the operating module (M5) via the CAN bus (B).

17. The agricultural apparatus as defined in claim 15, wherein the CAN-bus is connected to a plurality of microprocessors including the on-board processor (8) and the operating module (M5) includes means for transferring data entities directly between said microprocessors and the controlling processor (1).

* * * * *